ARTICLE CLEANING AND STORAGE UNIT

Filed Sept. 30, 1969 2 Sheets-Sheet 1

INVENTOR.
LEWIS RABINOWITZ

BY

Bean & Bean
ATTORNEYS

Nov. 23, 1971 L. RABINOWITZ 3,621,855

ARTICLE CLEANING AND STORAGE UNIT

Filed Sept. 30, 1969 2 Sheets-Sheet 2

INVENTOR.
LEWIS RABINOWITZ

BY

Bean & Bean
ATTORNEYS

United States Patent Office 3,621,855

Patented Nov. 23, 1971

3,621,855

ARTICLE CLEANING AND STORAGE UNIT

Lewis Rabinowitz, Tonawanda, N.Y., assignor to Ellar Products, Inc., Silver Creek, N.Y.

Filed Sept. 30, 1969, Ser. No. 862,364
Int. Cl. B08b 3/04, 11/02
U.S. Cl. 134—57 R 12 Claims

ABSTRACT OF THE DISCLOSURE

A container is provided with a plural pocketed basket for individually supporting articles, such as contact lenses, within a cleaning and/or storage solution. One or more movable solution agitating elements, which are loosely positioned within the container out of contact with the artciles, are adapted to be sonically vibrated to effect agitation of the solution by either manually moving the container or placing the container on a support device operable to place the agitating element in a pulsating magnetic field. The support device features a wobble base support for the container, which serves to increase the degree of solution agitation by effecting simultaneous movement of the container.

SUMMARY OF THE INVENTION

The present invention is directed towards article cleaning devices and more particularly to a unit having a pocket size container in which contact lenses may be both cleaned and readily transported.

In accordance with the preferred embodiment of the present invention, the container is provided with a plural pocketed basket for individually supporting contact lenses within a suitable lens cleaning and/or storage solution, and one or more elements, which are loosely supported within the container out of contact with the lenses to be treated. The elements are adapted to be subjected to sonic vibration for the purpose of agitating the treating solution in contact with the lenses.

Vibration of the solution agitating elements may be effected by manually manipulating the container or, when the elements are formed of a magnetic material, by placing the elements within a pulsating magnetic field.

The present invention additionally features a novel container support device operable to generate a pulsating magnetic field. The support device includes a casing, which encloses an electromagnet and an electromagnetic control circuit including a diode for converting conventional house circuit into direct current for operating the electromagnet in a pulsating manner and a thermo switch operable to automatically break the circuit through the electromagnet whenever its temperature exceeds a predetermined value. The provision of a thermo switch serves to protect the electromagnet from damage should a user inadvertently neglect to disconnect the unit from a source of current during long periods of non-use.

The support device includes a ring like retainer which is adapted to loosely center the container on an upper surface of the support device in alignment with the magnetic field produced by the electromagnet. Projecting from the upper surface of the support device in a substantially centered relationship with respect to the retaining ring is a projection, which serves to space the bottom of the container relative to the support surface. When the electromagnet is operated, the magnetic element positioned within the container is vibrated to effect agitation of the treating solution; vibratory movement of the element additionally causing the container to wobble and "walk around" the spacing projection. As a result, the degree of solution agitation is increased over that obtainable by the mere magnetically induced vibrations of the element.

Furthermore, the retaining ring and spacing projection are preferably formed of a resilient material, which serves to increase the degree of movement of the container relative to the support device. By this arrangement, optimum treating solution agitation may be obtained by employing the relatively weak magnetic field produced by an inexpensive, light weight electromagnet.

DRAWINGS

The nature and mode of operation of the present invention will now be more fully described in the following detailed description taken with the accompanying drawings wherein.

DETAILED DESCRIPTION

Figure 5:
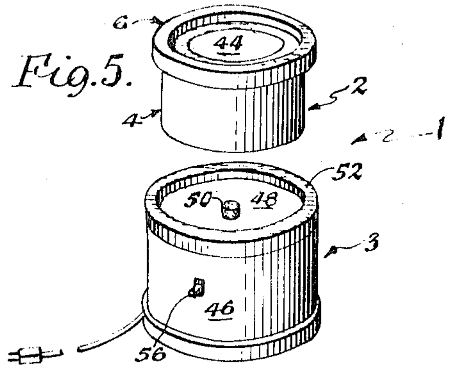
FIG. 5 is a perspective view illustrating the receiver and the support device therefor.

The article cleaning and/or storage unit of the present invention is generally designated as 1 in FIG. 5. Unit 1 includes in combination an artcile receiver 2 and a support device 3 on which receiver 2 is adapted to be removably mounted for the purpose of automatically imparting desired agitating movement to a suitable article cleaning and/or storage solution contained within the receiver. It will be understood, however, that the receiver is sized to permit it to be readily portable and thus may be manually manipulated to effect agitation of the treating solution, if desired.

While the unit of the present invention has utility in the fluid treating of diverse types of articles, the preferred embodiment of the present invention will be described as having particular utility in the cleaning and storage of pairs of conventionally sized contact lenses.

Figure 1:
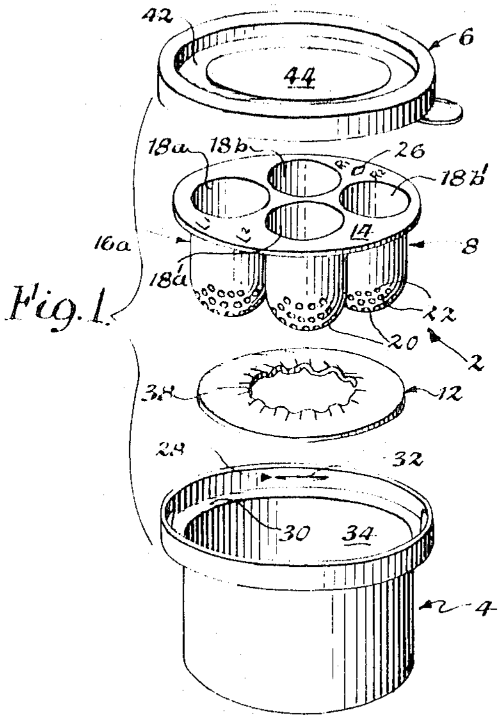
FIG. 1 is an exploded perspective view of the article cleaning and/or storage receiver of the present invention.
Figure 3:
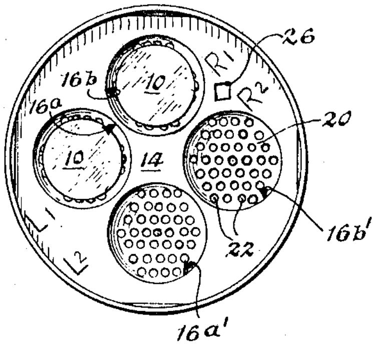
FIG. 3 is a top plan view of the assembled receiver of FIG. 1, but showing the cover device removed.
Figure 2:
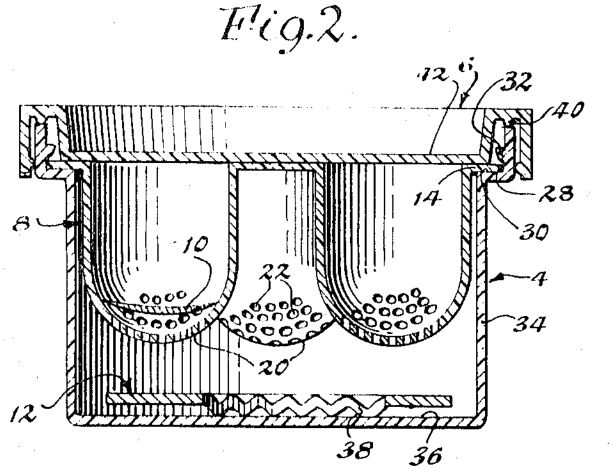
FIG. 2 is a vertical sectional view taken through the assembled receiver of FIG. 1.

Now referring particularly to FIGS. 1–3, it will be understood that in accordance with the preferred embodiment of the present invention, receiver 2 includes an open mouth container 4 of circular cross-sectional configuration, which is adapted to receive a suitable contact lens cleaning and/or storage solution, not shown; a cap type cover or closure device 6; a basket device 8 for supporting contact lenses 10 to be cleaned; and a solution agitating element 12. Preferably, container 4, cover device 6 and basket device 8 are formed of a suitable plastic material, whereas element 12 is formed of a suitable magnetic material, such as steel, which is coated or otherwise treated with a material serving to protect the element from chemical reaction with the treating solution to be employed.

In FIGS. 1–3, basket device 8 is shown as being of integrally formed construction and as including a circular flange portion 14 and two pairs of pockets **16*a*, 16*b* and 16*a*′, 16*b*′, which depend from adjacent pocket mouth defining apertures 18*a*, 18*b*, 18*a*′, 18*b*′, respectively, formed in flange portion 14. Each of pockets 16*a*–16*b*′** is of general cylindrical construction terminating in a hemispherical shaped bottom portion 20, which is provided with a plurality of apertures 22. Apertures 22 serve to place the interiors of pockets 16*a*–16*b'* in free fluid communication with the treating solution, not shown, within container 4.

As best shown in FIG. 3, each of pockets 16*a*–16*b'* is dimensioned so as to loosely receive a conventional sized contract lens 10 in order to permit free flow of treating solution across both surfaces of the lens and facilitate wihdrawal thereof from the pocket by the finger of the wearer.

Basket device 8 is made to accommodate two pairs of contact lenses, so that a wearer will always have a clean pair available for use. To insure that a user will not interchange lenses of each pair, pocket mouth defining apertures 18*a*–18*b'* are grouped in pairs and visually separated by a diamond or other suitably shaped aperture 26 formed in flange portion 14. Further, flange portion 14 is provided with suitably printed or embossed indicia $L_1$–$R_2$ in order to clearly indicate the left and right hand lenses of each pair of contact lenses.

As best shown in FIG. 2, basket device 8 is removably mounted in container 4 by snap fitting circular flange portion 14 into a recess 28 defined by a radially extending flange portion 30 and stop devices 32, the latter being arranged in a circumferentially spaced relationship on the inner surface of container side wall 34 intermediate flange 3C and the container mouth. When basket device 8 is thus positioned, pocket bottom portions 20 are disposed in a spaced relationship to container bottom wall 36 and cooperate therewith to loosely position element 12.

Referring particularly to FIGS. 1 and 2, it will be seen that element 12 is in the form of a ring-shaped member having an outside diameter less than the inside diameter of container side wall 34, and upstanding portions 38 which serve to space the element from the container bottom wall. This arrangement provides for free flow of treating solution about the element and permits unrestricted vibratory movement thereof within the space intermediate the basket device and container bottom wall.

Cover device 6 is adapted to be removably mounted, as by friction fitting, in a fluid sealing relationship on container 4 by suitable means, such as sealing beads 40. Preferably, central portion 42 of cover device 6 is deformed downwardly, in the manner best shown in FIG. 2, such that when mounted on container 4, the central portion lies immediately adjacent circular flange portion 14 in order to prevent escape of contact lenses from pockets 16*a*–16*b'*.

A mirror device 44, formed of a metal foil or the like, is adhesively affixed to the outwardly facing surface of central portion 42, as an aid to a wearer in the removal and application of his contact lenses. Mirror 44 is protected from abrasion or other damage by the relatively raised peripheral portions of the cover device.

Figure 4:
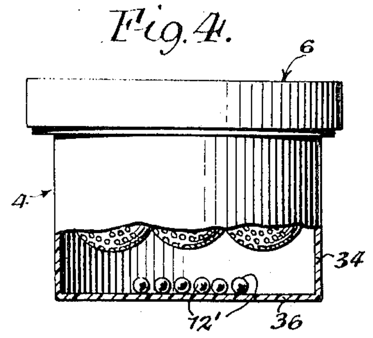
FIG. 4 is a partially broken away side elevational view illustrating an alternative embodiment of the present invention.

FIG. 4 illustrates a modified embodiment of the present invention, which differs only from that previously described in that a plurality of conventional steel ball bearings 12' replace ring like agitating element 12.

It will be understood that in both of the above described embodiments of the present invention, contact lenses may be cleaned by manually manipulating or shaking receiver 2 to impart sonic vibrations to element 12 or 12', the movement of such element or elements through the treating solution within the container causing the solution to flow in and out of pockets 16*a*–16*b'* in a scrubbing relation to the contact lenses supported therein. Motion of the receiver also causes the contact lenses to continuously reposition themselves within their respective pockets, so as to insure that their entire surfaces are exposed to the scrubbing action of the treating fluid.

When it is desired to both automatically effect agitation of the treating solution and to even more thoroughly clean his contact lenses, the user may place receiver 2 on support device 3, which is operable to effect sonic vibration of element 12, by means of a pulsating magnetic field.

Support device 3 is best shown in FIG. 5 as including a casing 46, which is provided with an upper wall portion 48 from which extends a substantially centrally disposed projection 50 and a container restrainer means in the form of a ring member 52.

Figure 6:
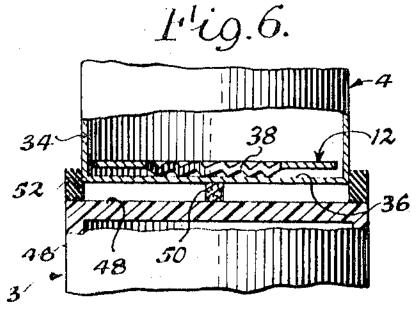
FIG. 6 is a fragmentary view showing the receiver mounted on the support device.
Figure 7:
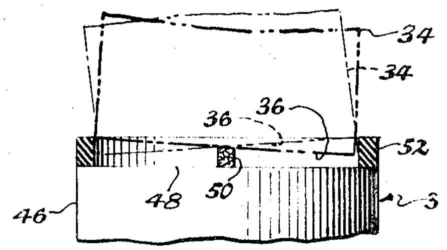
FIG. 7 is a fragmentary view illustrating the manner in which the receiver moves relative to the support device during the article cleaning operation.

Referring particularly to FIGS. 6 and 7, it will be seen that ring member 52 is adapted to loosely receive container side wall 34, so as to substantially center the container relative to projection 50, while permitting tilting or wobbling of the container relative to casing top wall portion 48 about projection 50.

Figure 8:
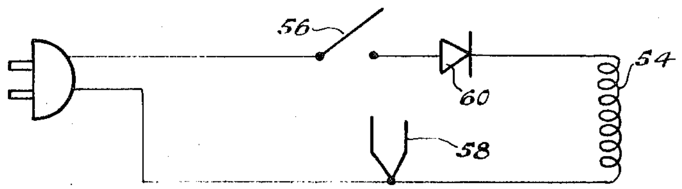
FIG. 8 is a schematic view illustrating the electrical circuit enclosed by the support device.

Arranged inwardly of casing 46 at a point substantially centered beneath top wall portion 48 is an electromagnet in the form of a coil 54 shown schematically in FIG. 8, and whose operation is controlled by the electrical circuit also shown schematically in FIG. 8. In FIG. 8, the control circuit is shown as being adapted to connect coil 54 to a suitable source of current, such as conventional house current, and as including an on-off switch 56, which is accessible through an opening in casing 46, a thermo switch 58, which is responsive to the temperature of the electromagnet and adapted to interrupt the flow of current thereto when its temperature rises above a predetermined operating level; and a diode 60, which serves to convert conventional alternating current into a pulsating direct current for driving the electromagnet so as to produce a pulsating magnetic field.

Thermo switch 58 is a particularly desirable feature of the present invention since it will protect the electromagnet from damage should a user inadvertently leave the unit running beyond the required cleaning time for his contact lenses.

The nature of the agitating movement imparted to element 12 and the lens treating solution may be readily observed by removing cover device 6 and basket device 8 from the container, and filling the container with treating solution to a depth which would normally immerse at least the bottom of the contact lens receiving pockets, before placing the container on support device 3.

As the container is lowered into its supporting position adjacent casing top wall portion 48, element 12 is brought into the effective magnetic field setup by the electromagnet, such that it begins to vibrate. As a result, pronounced ripples are set up on the surface of the treating solution, which together with the element tend to move or rotate about the center of the container bottom wall. While the exact reason for this rotational movement is not known, it is believed that it results from the fact that each of the ring shaped agitating elements tested was slightly out of round and thus the effects of the magnetic field varied annularly thereof.

When the container is released after being positioned such that it is bottom wall supported on projection 50 and restrained by ring member 52, the container experiences a severe tilting, rocking, or wobbling movement and begins to slowly "walk" or rotate about pin 50. As a result, the degree of movement of the treating solution is increased to the extent that droplets of solution are formed and propelled upwardly into the air through the mouth of the container.

Repeated experiments have determined that maximum solution agitation occurs when the supporting projection 50 and restraining ring member 52 are formed of a resilient material, such as felt, rubber or plastic, and are disposed in a slightly eccentric manner.

While the preferred embodiment of the present invention has been described in detail, various changes and modification thereof will likely occur to those skilled in the art in view of the foregoing description. Accordingly, I wish to be limited only by the scope of the appending claims wherein

I claim:

1. An article treating unit adapted for use in the cleaning and/or storage of articles in the form of two pairs of contact lenses comprising in combination:

a container having side and bottom walls and an open mouth, said container being adapted to receive a contact lens cleaning and/or storage solution;

a cover device removably mounted on said container for closing said container mouth in order to retain said solution within said container;

a basket device supported inwardly of said container, said basket being of integrally formed plastic construction including a flange portion and at least four contact lens receiving pockets, each said pocket depending from adjacent a pocket mouth defining aperture in said flange portion, each said pocket being of generally cylindrical construction dimensioned to freely receive one of said lenses therein and terminating in a generally hemispherically shaped bottom portion disposed in spaced relationship to said container bottom wall, at least said bottom portion being apertured to place the interior thereof in free flow communication with said solution in said container, said flange portion being fitted into said container adjacent said container mouth and having indicia adjacent said mouth defining apertures thereof to indicate into which of said pockets each lens of said two pairs of lenses to be carried in said pockets are to be positioned, said cover device being formed of plastic material and serving when mounted on said container to close the mouth of each said pocket to prevent escape of a contact lens therefrom; and at least one element loosely positioned within said container intermediate said pocket and said container bottom wall, said element when moved relative to said container serving to agitate said solution.

2. An article treating unit according to claim 1, wherein said container side wall is of circular cross-sectional configuration and said element is a thin member of ring-like configuration having an outside diameter less than the inside diameter of said container side wall, and said ring member being formed of magnetic material and having portions projecting normal to the plane thereof so as to position said ring member in a spaced relationship to said container bottom wall.

3. An article treating unit according to claim 1, wherein said cover device carries a mirror device viewable by a user when said cover device is mounted on said container.

4. An article treating unit comprising in combination:

a container having side and bottom walls and an open mouth, said container being adapted to receive an article treating solution;

a cover device removably mounted on said container for closing said container mouth in order to retain said solution within said container;

a basket device supported inwardly of said container, said basket device defining at least one pocket having a mouth opening in the direction of said container mouth and a bottom wall disposed in spaced relationship to said container bottom wall, each said pocket being dimensioned to freely receive an article to be cleaned therein and being perforated to place the interior thereof in free flow communication with said solution within said container;

at least one element formed of magnetic material loosely positioned within said container intermediate said pocket and said container bottom wall, said element when moved relative to said container serving to agitate said solution; and a device adapted to removably support said container thereon, said support device including a casing having an upper wall portion, electromagnetic means positioned inwardly of said casing adjacent said upper wall portion and adapted to produce a pulsating magnetic field to be completed by said element when said container is bottom wall supported on said support device, and control circuit means for said electromagnetic means, one of said container and said casing having a projection adapted to space said container bottom wall from said upper wall portion, and one of said container and said casing having restraining means adapted to removably maintain said container bottom wall in a substantially centered relationship relative to said magnetic field produced by said electromagnetic means, while permitting tilting of said container relative to said upper wall portion about said projection.

5. An article treating unit according to claim 4, wherein said restraining means and said projection are formed of resilient material.

6. An article treating unit comprising in combination:

a container having side and bottom walls and an open mouth, said container being adapted to receive an article treating solution;

a cover device removably mounted on said container for closing said container mouth in order to retain said solution within said container;

a basket device supported inwardly of said container, said basket device defining at least one pocket having a mouth opening in the direction of said container mouth and a bottom wall disposed in spaced relationship to said container bottom wall, each said pocket being dimensioned to freely receive an article to be cleaned therein and being perforated to place the interior thereof in free flow communication with said solution within said container;

at least one element formed of magnetic material loosely positioned within said container intermediate said pocket and said container bottom wall, said element when moved relative to said container serving to agitate said solution; and a device adapted to removably support said container, said support device including a casing having an upper wall portion, electromagnetic means positioned inwardly of said casing adjacent said upper wall portion and adapted to produce a pulsating magnetic field to be completed by said element when said container is bottom wall supported on said support device, a projection extending upwardly from said upper wall portion and adapted to space said container bottom wall therefrom, restraining means projecting upwardly from said upper wall portion, said restraining means being adapted to loosely receive said container so as to substantially center said container bottom wall relative to said magnetic field produced by said electromagnetic means while permitting tilting of said container on said projection relative to said upper wall portion, and control circuit means for said electromagnetic means.

7. An article treating unit according to claim 6, wherein said container bottom wall is substantially flat and of circular configuration, said restraining means is of ring-like configuration and adapted to freely receive said container side wall inwardly thereof, and said projection is disposed eccentrically of said restraining means.

8. An article treating unit according to claim 7, wherein said restraining means and said projection are formed of resilient material.

9. An article treating unit according to claim 6, wherein said circuit means includes means to apply pulsating direct current to said electromagnetic means, and switch means responsive to the temperature of said electromagnetic means, said switch means controlling the application of current to said electromagnetic means in accordance with the temperature thereof.

10. An article treating unit adapted for use in the cleaning and/or storage of articles in the form of at least one pair of contact lenses;

a container having non-apertured side and bottom walls and an open mouth, said container being adapted to receive a contact lens cleaning and/or storage solution;

a cover device removably mounted on said container for closing said container mouth in order to retain said solution within said container;

a basket device supported inwardly of said container, said basket device including a flange portion and at least two contact lens receiving pockets, each of said pockets depending from adjacent a pocket mouth defining aperture in said flange portion, each of said pockets being dimensioned to freely receive one of said lens therewithin and being perforated to place the interior thereof in free flow communication with said solution, said flange portion being supported adjacent said container mouth and having indicia means for indicating into which of said pockets each lens of said pair of lenses to be carried in said pockets is to be positioned, said cover device when mounted being arranged immediately adjacent said flange portion thereby to close the mouth of each said pocket and prevent escape of a lens therefrom; and at least one element loosely received within said container intermediate said pockets and said container walls, said element when moved relative to said container serving to agitate said solution.

11. An article treating unit according to claim 10, wherein said cover device carries a mirror device viewable when said cover device is mounted on said container.

12. An article treating unit according to claim 10, wherein said container, said cover device and said basket device are formed of non-magnetic plastic material and said element is formed of a magnetic material.

References Cited

UNITED STATES PATENTS

| | | | |
|---|---|---|---|
| 1,590,470 | 6/1926 | Means | 134—187 |
| 2,480,502 | 8/1949 | Nieder | 134—118 |
| 2,641,452 | 6/1953 | Wagner | 259—DIG. 46 |
| 2,664,854 | 1/1954 | Talbot | 134—135 X |
| 3,088,716 | 5/1963 | Stott | 259—DIG. 46 |
| 3,206,173 | 9/1965 | Burger et al. | 259—DIG. 46 |
| 3,399,869 | 9/1968 | Loria et al. | 134—184 X |

FOREIGN PATENTS

| | | | |
|---|---|---|---|
| 81,618 | 4/1953 | Norway | 259—DIG. 46 |

ROBERT L. BLEUTGE, Primary Examiner

U.S. Cl. X.R.

134—118, 185, 187; 206—5 A; 259—DIG. 46, 72